United States Patent [19]
Walker

[11] Patent Number: 5,425,927
[45] Date of Patent: Jun. 20, 1995

[54] HAFNIUM DIOXIDE PURIFICATION

[75] Inventor: Roy G. Walker, Ogden, Utah

[73] Assignee: Westinghouse Electric Corporation, Pittsburgh, Pa.

[21] Appl. No.: 271,216

[22] Filed: Jun. 27, 1994

[51] Int. Cl.6 .............................................. B01F 1/00
[52] U.S. Cl. ........................................ 423/20; 423/69; 423/85; 423/658.5
[58] Field of Search ...................... 75/398, 344, 612; 423/3, 20, 69, 85, 658.5

[56] References Cited

U.S. PATENT DOCUMENTS

| | | | |
|---|---|---|---|
| 4,067,953 | 1/1978 | Roux et al. | 423/80 |
| 4,880,607 | 11/1989 | Horton et al. | 423/20 |
| 4,913,884 | 4/1990 | Feuling | 423/9 |
| 5,051,165 | 9/1991 | Andrews | 209/166 |
| 5,085,837 | 2/1992 | Chao et al. | 423/82 |

Primary Examiner—Ngoclan Mai

[57] ABSTRACT

Hafnium dioxide contaminated with 0.1 to 1 weight percent uranium dioxide is contacted with an aqueous acid such as nitric acid, hydrochloric acid, sulfuric acid and mixtures thereof to leach the uranium dioxide from the hafnium dioxide, thereby producing a slurry of a uranium-containing leachate containing hafnium dioxide solids. The slurry is filtered to separate the uranium-containing leachate from the hafnium dioxide solids, which are then dried to produce hafnium dioxide containing less than about 0.005 wt % uranium dioxide. The hafnium dioxide may then be released for uncontrolled commercial uses.

The separated uranium-containing leachate is neutralized to precipitate uranyl hydroxide, which is then separated from the leachate. The uranyl hydroxide may be processed to produce uranium-containing products or may be disposed of as radioactive wastes having a fraction of the total volume of radioactive wastes which would need to be buried if the hafnium dioxide could not be recovered for commercial uses. In addition, separated leachate from the uranyl hydroxide precipitation step can be recycled or discharged to settling ponds.

6 Claims, 1 Drawing Sheet

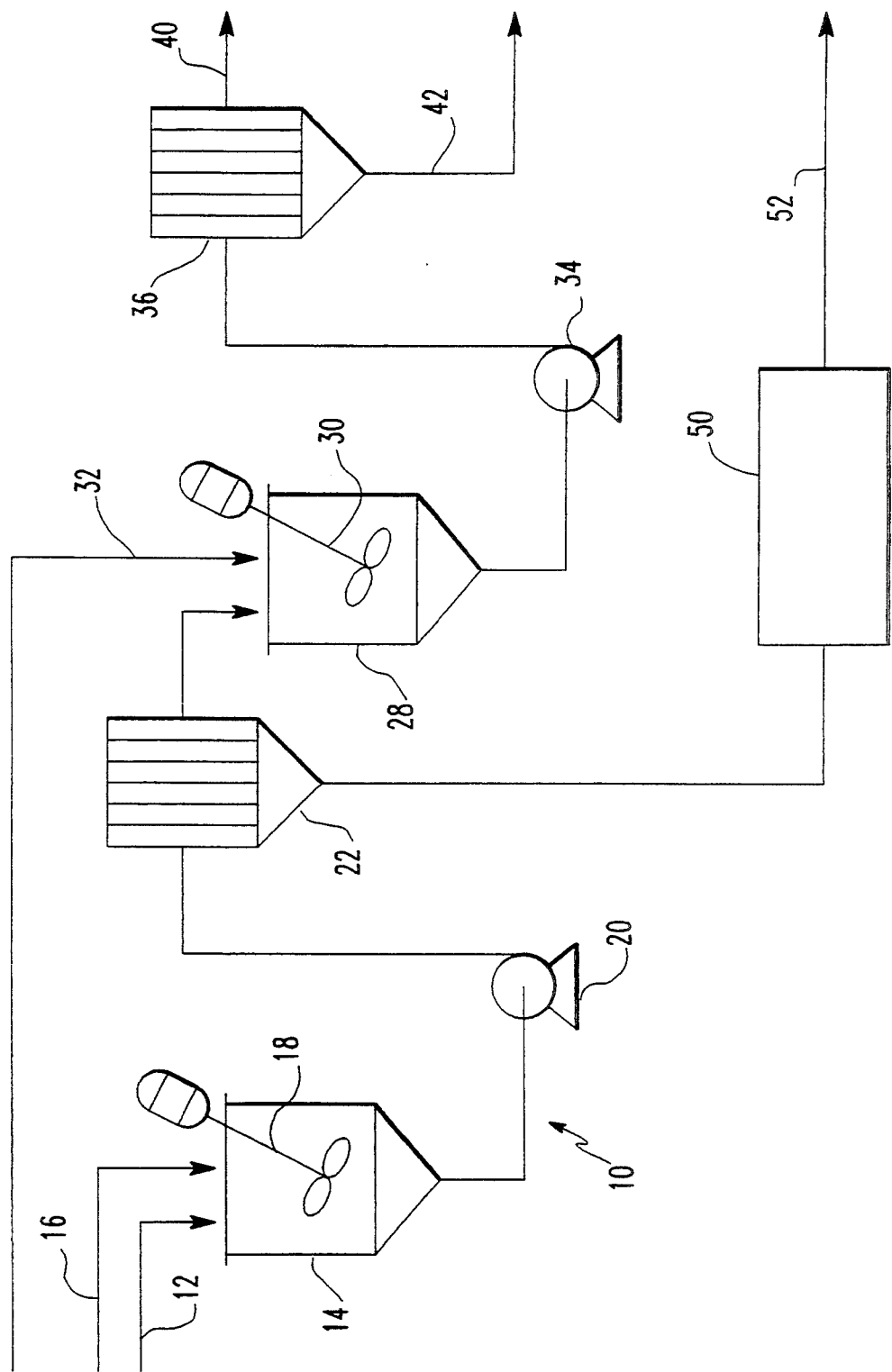

HAFNIUM DIOXIDE PURIFICATION

BACKGROUND OF THE INVENTION

The invention relates to the purification of hafnium dioxide contaminated with uranium dioxide.

Hafnium dioxide is commercially produced as a by-product in the manufacture of zirconium from zircon and similar ores. Generally in the course of production, zirconium and hafnium contaminated with impurities such as iron and other metals from the ore and from the processing facility are dissolved in an aqueous acid and then separated in a solvent extraction step as is disclosed by Greenberg U.S. Pat. No. 3,069,232 et al., Miller U.S. Pat. No. 3,006,719 and Overholser U.S. Pat. No. 2,938,769 et al. Typically, the hafnium is recovered from the solvent extraction step as hafnium hydroxide [Hf(OH)$_4$] contaminated with from about 0.1 wt % to about 1 wt % uranium dioxide [UO$_2$] based upon the weight of the hafnium hydroxide as hafnium dioxide [HfO$_2$]. The hafnium hydroxide may be calcined and further processed for use in nuclear applications.

The hafnium dioxide from commercial zirconium plants frequently cannot be used in non-nuclear applications because of radiation due to relatively high uranium impurity levels. The uranium impurity level in hafnium dioxide must be reduced to below about 0.005 wt % (as uranium dioxide) before the hafnium dioxide can be released for commercial non-nuclear applications. However, a practical economical hafnium dioxide purification process has not been developed by the art and, heretofore, much of the hafnium dioxide which could not be used in nuclear applications has been buried as low level radioactive waste.

SUMMARY OF THE INVENTION

It is an object of the present invention to purify hafnium dioxide contaminated with uranium dioxide. It is a further object to reduce the cost of wastes associated with the production of hafnium dioxide which must be treated as low level radioactive wastes.

With these objects in view, the present invention resides in a method for purifying hafnium dioxide contaminated with from about 0.1 wt % to about 1 wt % uranium dioxide. The hafnium dioxide is contacted with an aqueous acid which may be nitric acid, hydrochloric acid, sulfuric acid or a mixture of these acids to leach the uranium dioxide from the hafnium dioxide, thereby producing a slurry of hafnium dioxide solids in a uranium-containing leachate.

The uranium-containing leachate is then separated from the hafnium dioxide solids, preferably by filtering. The leachate is neutralized to precipitate uranyl hydroxide. Preferably, the uranyl hydroxide is precipitated with ammonia or ammonium hydroxide. The leachate is then separated from the uranyl hydroxide precipitate, preferably by filtering. Preferably, the separated leachate is then recycled or discharged to settling ponds.

The separated hafnium dioxide is preferably water washed. The hafnium dioxide is then dried to produce hafnium dioxide contaminated with less than about 0.005 wt % uranium dioxide.

BRIEF DESCRIPTION OF THE DRAWINGS

The invention as set forth in the claims will become more apparent from the following detailed description of a preferred embodiment thereof shown, by way of example only, in the accompanying flowsheet of the present invention.

DESCRIPTION OF THE PREFERRED EMBODIMENT

Referring now to the flowsheet in detail there is shown a plant 10 for purifying hafnium dioxide containing from about 0.1 wt % to about 1 wt % uranium dioxide.

Hafnium dioxide 12 in an aqueous solution (as hafnium hydroxide) or a slurry or as a solid feed contaminated with uranium dioxide may be added to a leaching vessel 14 where it is contacted with an aqueous acid 16 such as nitric acid, hydrochloric acid, sulfuric acid or mixtures of these acids to leach the uranium dioxide from the hafnium dioxide. The vessel 14 is preferably agitated by an agitator 18 to provide effective contact between the acid and the solids. In a preferred practice, the slurry comprises up to about 40 wt % or more of hafnium dioxide solids in a nitric acid leachate at a pH of about 2 and at a temperature of about 40° C.

The slurry in the leaching vessel 14 may then be transferred by a pump 20 to a filter such as pressure filter 22 for separating the uranium-containing leachate from a hafnium dioxide cake. Preferably, the hafnium dioxide cake is water washed on the filter 22 with at least about one cake volume or more of wash water.

The separated uranium-containing leachate may then be transferred from the filter 22 to a neutralization vessel 28. The neutralization vessel 28 is preferably agitated by an agitator 30 to provide effective contact between the leachate and the neutralizing agent. The leachate may be neutralized with ammonia or ammonium hydroxide 32 or other suitable neutralizing agent to precipitate uranyl hydroxide in the neutralization vessel 8. In a preferred practice of the present invention, the slurry in the neutralization vessel 28 comprises up to about 10 wt % or more of uranyl hydroxide solids in an aqueous solution having a pH of about 10.

The slurry in the neutralization vessel 28 may then be transferred by a pump 34 to a second filter such as pressure filter 36 for separating the neutralized leachate 40 from a uranyl hydroxide cake 42. The uranyl hydroxide cake may be further processed to produce uranium oxide or may be treated as low level waste and buried. Advantageously, the volume of the uranium oxide waste product is considerably less than the volume of the contaminated hafnium oxide which would need to be buried so that the disposal costs are considerably reduced. Also, the separated neutralized leachate may be sufficiently uncontaminated that it may be recycled or discharged to a settling pond after being neutralized to a pH of about 7 by an acidic waste or process stream (not shown). Advantageously, the separated neutralized leachate need not be treated as a low level waste stream.

The hafnium dioxide separated from the filter 22 is dried by calcining in a kiln operating at a process temperature of up to about 765° C. or more such as a rotary kiln 50 to produce hafnium dioxide contaminated with less than about 0.005 wt % uranium dioxide 52.

While a present preferred embodiment of the present invention has been shown and described, it is to be understood that the invention may be otherwise variously embodied within the scope of the following claims of invention.

I claim:

1. A method for purifying hafnium dioxide contaminated with uranium dioxide, comprising the steps of:
   contacting hafnium dioxide contaminated with from about 0.1 wt. % to about 1 wt. % uranium dioxide with an aqueous acid selected from the group consisting of nitric acid, hydrochloric acid, sulfuric acid and mixtures thereof to leach the uranium dioxide from the hafnium dioxide, thereby producing a slurry of a uranium-containing leachate containing hafnium dioxide solids;
   separating the uranium-containing leachate from the hafnium dioxide solids;
   drying the hafnium dioxide solids to produce hafnium dioxide containing less than about 0.005 wt % uranium dioxide;
   neutralizing the uranium-containing leachate to precipitate uranyl hydroxide;
   separating the neutralized leachate from the precipitated uranyl hydroxide.

2. The method of claim 1, wherein the contaminated hafnium dioxide is leached with nitric acid.

3. The method of claim 1, wherein the hafnium dioxide is leached at a temperature of about 40° C. in an acid having a pH of about 2.

4. The method of claim 3, wherein the slurry comprises about 40 wt % hafnium dioxide.

5. The method of claim 4, wherein the hafnium dioxide solids separated from the uranium-containing leachate is dried at a temperature of about 765° C.

6. A method for purifying hafnium dioxide contaminated with uranium dioxide, comprising the steps of:
   contacting hafnium dioxide contaminated with from about 0.1 wt. % to about 1 wt. % uranium dioxide with an aqueous acid selected from the group consisting of nitric acid, hydrochloric acid, sulfuric acid and mixtures thereof to leach the uranium dioxide from the hafnium dioxide, thereby producing a slurry comprising a uranium-containing leachate having a pH of about 2 containing hafnium dioxide solids;
   filtering the uranium-containing leachate from the hafnium dioxide solids to produce a hafnium dioxide cake;
   water washing the hafnium dioxide cake;
   calcining the water-washed hafnium oxide cake to produce hafnium dioxide containing less than about 0.005 wt % uranium dioxide;
   neutralizing the uranium-containing leachate to a pH of about 10 to precipitate uranyl hydroxide;
   filtering the neutralized leachate from the precipitated uranyl hydroxide to produce a uranyl hydroxide cake; and
   discharging the neutralized leachate to settling ponds.

* * * * *